Figure 6:
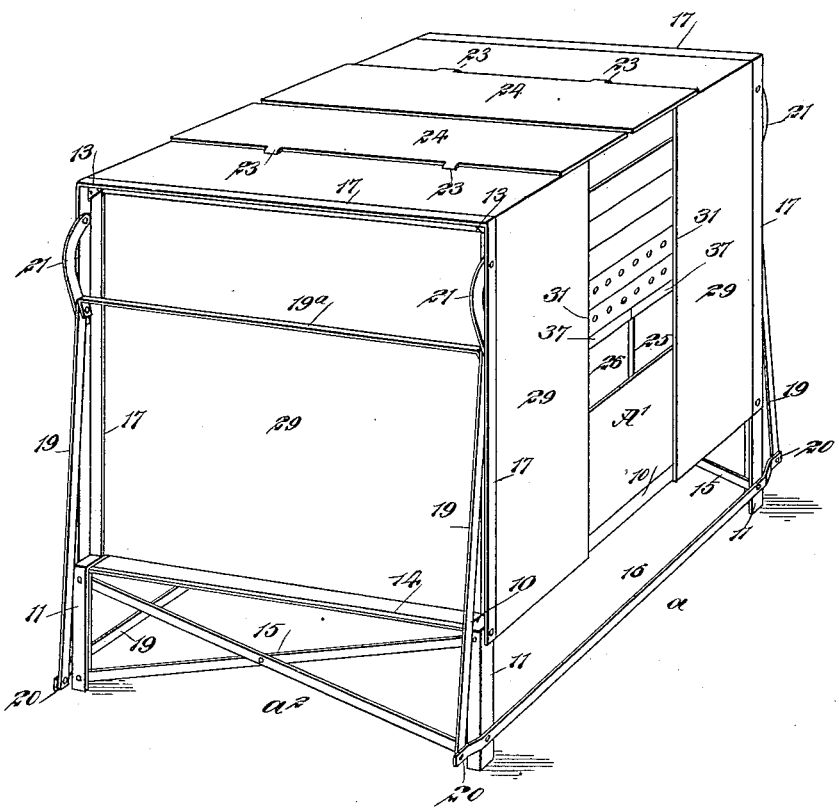

No. 659,681. Patented Oct. 16, 1900.
W. C. LANDY.
CAMP COOKING STOVE.
(Application filed Oct. 10, 1899.)
(No Model.) 3 Sheets—Sheet 1.
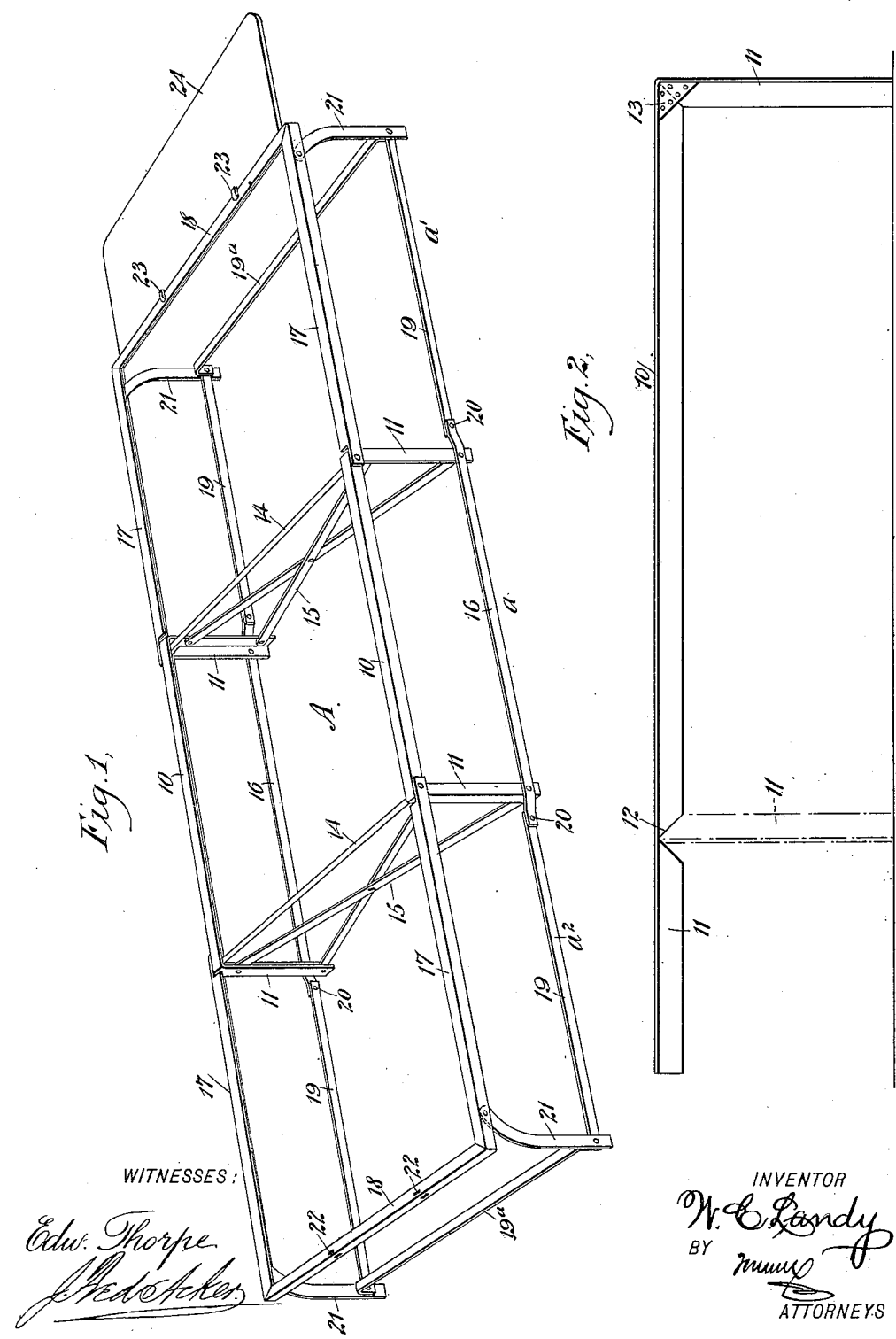
WITNESSES:
Edw. Thorpe
INVENTOR
W. C. Landy
BY
ATTORNEYS No. 659,681. Patented Oct. 16, 1900.
W. C. LANDY.
CAMP COOKING STOVE.
(Application filed Oct. 10, 1899.)
(No Model.) 3 Sheets—Sheet 2.
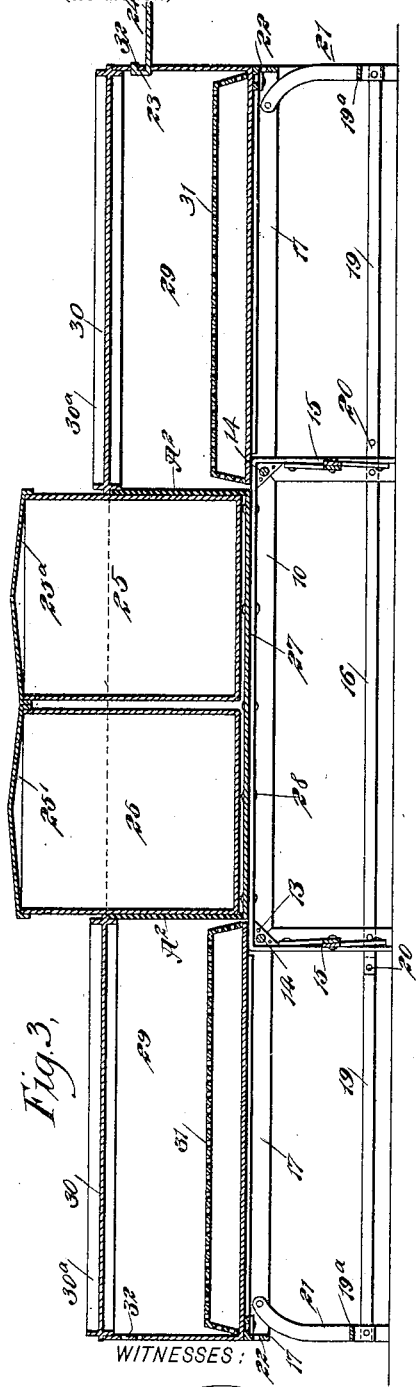
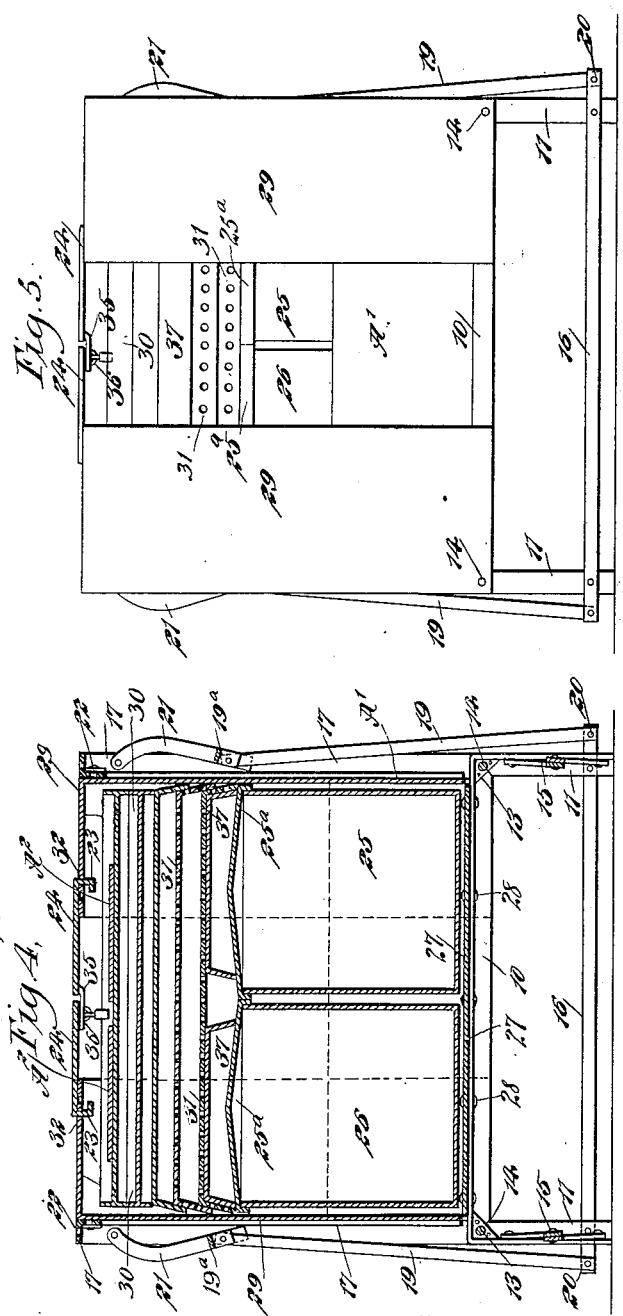
WITNESSES:
Edward Thorpe
J. Fed Acker
INVENTOR
W. C. Landy
BY Munn
ATTORNEYS
THE NORRIS PETERS CO., PHOTO-LITHO., WASHINGTON, D. C.

No. 659,681. Patented Oct. 16, 1900.
W. C. LANDY.
CAMP COOKING STOVE.
(Application filed Oct. 10, 1899.)

(No Model.) 3 Sheets—Sheet 3.

WITNESSES: Edward Thorpe

INVENTOR
W. C. Landy
BY
ATTORNEYS

UNITED STATES PATENT OFFICE.

WILLIAM C. LANDY, OF NEW YORK, N. Y.

CAMP COOKING-STOVE.

SPECIFICATION forming part of Letters Patent No. 659,681, dated October 16, 1900.

Application filed October 10, 1899. Serial No. 733,142. (No model.)

*To all whom it may concern:*

Be it known that I, WILLIAM C. LANDY, of the city of New York, borough of Manhattan, in the county and State of New York, have invented a new and Improved Camp Cooking-Stove, of which the following is a full, clear, and exact description.

One object of my invention is to construct a complete range, cooker, and field-kitchen combined which will simplify outdoor cooking and obviate wastefulness of food and fuel and which will likewise tend to preserve the flavor of the articles cooked and minimize the danger of scorching.

Another object of the invention is to provide a stove or range, especially adapted for the needs and use of soldiers, lumbermen, camping parties, and the like, which will have a large heating-surface and from which the best possible results can be obtained by the least amount of fuel.

Another object of the invention is to so construct the stove or range that it will fold up and occupy but a small space and may be readily dissected and carried on pack animals when necessary.

Another object of the invention is to construct a stove of the character described which will be simple, light, durable, and economic and which when folded will inclose and retain in position all needed utensils or utensils adapted for field service and form a kitchen-cabinet or a complete chest, the weight being reduced to a minimum.

Another object of the invention is to so proportion the device that even in its largest size it will fit the depth of any of the army wagons and to so construct the device that when folded and locked it will be so strong and durable that it will effectually withstand the hard usage to which it would ordinarily be subjected.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a perspective view of the frame of the stove. Fig. 2 is a side elevation of a portion of the frame, illustrating the manner in which the stationary legs are formed from the upper structure of the frame. Fig. 3 is a longitudinal vertical section through the improved stove or range in position for use. Fig. 4 is a vertical section through the stove or range when folded for storage or for transportation, showing the manner in which the utensils are inclosed. Fig. 5 is a side elevation of the stove or range when folded, and Fig. 6 is a perspective view of the same.

The frame A of the stove is constructed in three sections—a central section $a$ and two end sections $a'$ and $a^2$. The central section $a$ consists of upper side bars 10, made of angle, T, or channel iron, and legs 11, which are continuous with the side bars, being bent down therefrom in a vertical direction. Before bending the legs 11 to place an angular or V recess 12 is made in the vertical members of the side bars 10, as shown in Fig. 2, so that when a leg 11 is carried to place the opposing walls of the recess 12 will be brought together, as is also shown in Fig. 2. The plates 13, obtained by producing the recesses 12, are employed as braces, as shown at the right in Fig. 2, being attached to a leg and to the upper bar 10 of the frame. The central portion of the frame is completed by the addition of removable rods 14 and cross-braces 15, which braces are attached to the legs 11, as is best shown in Fig. 1. The end sections $a'$ and $a^2$ of the frame each consist of upper side bars 17 of angle, T, or channel iron, end bars 18, of the same construction and continuous with the side bars 17, lower side bars 19, and lower end bars 19$^a$. The lower side bars 19 of the end sections of the frame, as shown at 20 in Fig. 1, are pivoted to extensions from the lower side bars 16 of the main section, preferably by key-bolts, so that the end sections of the frame may be carried up to a vertical position at right angles to the central section. The rods 14 pivotally connect the upper side bars of the end sections with the corresponding bars of the central section of the frame, as is shown in Fig. 1. The pivot-rods 14 and the key-bolts 20 are made removable in order that the sections may be conveniently separated and as conveniently placed upon a pack animal, for example, should occasion demand. The lower end bars 19$^a$ are utilized as handles when the device is folded up, as are likewise the cross-braces 15. Where the upper side bars 17 of the end sections $a'$ and $a^2$ connect with the corresponding side bars 10 of the central section $a$, the said upper side bars 17 have recesses in their upper members, as shown in Fig. 1, which enables the said end sections $a'$ and $a^2$ to be folded without obstruction.

Legs 21 are pivotally attached to the upper side bars of the end sections of the frame and likewise to the lower side bars 19, the end bars 19ª extending from one leg to the other of an end section, bracing the said legs. Slots 22 are provided in the upper end bars of the end sections of the frame, and these slots are adapted to receive lugs 23, projected from metal tables or shelves 24, as shown in Fig. 1, the said tables being adapted as repositories for various utensils or for any articles that are to be cooked, and when the tables 24 are in their lower position (shown in Fig. 1) they will be kept heated by reason of their proximity to the fire. The lugs 23 of the tables or shelves 24 are angular, comprising a member extending at an angle to the body of the shelf and a second member projecting over the shelf, as shown in Figs. 3 and 4. When a shelf is to be placed in position, the members of the lugs parallel with the body are introduced into the lower slots of a pair and the shelf is gradually carried downward and pressed slightly inward until when the body of the shelf reaches a horizontal position the upright members of the lugs will be parallel with a side of the oven and the horizontal members in position to enter the upper slots of a pair when the shelf is drawn outward, the slots being sufficiently large to admit of such manipulation. When a shelf is to be removed, it is pressed inward until the horizontal members of the lugs are free, and then the shelf is turned upward and drawn outward until the lugs can be removed through the lower slots of a pair.

A casing A' is supported on the side bars 10 of the central section of the frame, and the casing is usually provided with a bottom 27 and front and rear upwardly-extending flanges. Said casing is further provided with end plates $A^2$, which are preferably removable. The said casing is secured to the said side bars 10 by rivets 28 or their equivalents. Two receptacles 25 and 26 are placed within the casing A' side by side. These receptacles are provided with suitable covers 25ª, one receptacle being adapted to be used for heating water, while the other receptacle may be employed for preparing coffee or other beverages, although I do not confine myself to any particular use for said receptacles.

Ovens 29 are secured by rivets or like means to the end sections of the frame, as shown in Fig. 3, and each oven is provided with a suitable cover 30, having an upwardly-extending marginal flange 30ª. One of the ovens is adapted for baking bread, and the other oven may be used for roasting meat, and both ovens are provided with a perforated false bottom 31, having a downwardly-extending marginal flange, the said false bottoms being loosely placed in the ovens, permitting the hot air to circulate under and around the pan containing the material to be cooked, the pan being adapted to rest upon the said false bottom.

Each oven at its end portion is provided with slots 32, the slots being near the top of the ovens, and these slots 32 are adapted to receive the lugs 23 of the tables or shelves 24, so that the tables or shelves may be placed in a higher or in a lower position. When the tables or shelves are placed in their lower position, their lugs enter the slots that are produced in the upper end bars of the end sections of the frame, as stated. When the stove is to be transported or is not in use, the end sections are carried up to the vertical position, (shown in Figs. 4 and 5;) but previous to carrying the end sections to their upper positions the baking-pans 37 used and the false bottoms of the ovens, together with other utensils or other loose parts, are placed some upon the upper portions of the receptacles 25 and 26, as illustrated in Fig. 4, and others within said receptacles. Thus when the side sections of the stove are carried upward the pans and other paraphernalia may be held upon the central section of the stove within the two ovens, as shown in Fig. 4. The pans, oven-covers, and like parts nest one within the other, so that all of said parts will readily remain in the position in which they are placed.

It will be observed by reference to Fig. 4 that when the side sections of the device are to be swung up into their upright positions the pivotal connections of the lower side bars 19 and the legs 21 will not extend beyond a central point on the side bars 19, between the pivotal connections of the legs 21 with the end bars 18 and the pivotal connections of the bars 19 with the lower central side bars 16, and in consequence the ovens or end sections $a'$ and $a^2$ of the device will be locked in their upright positions and protected against hard usage. It will also be noticed that before the oven-sections $a'$ and $a^2$ can be moved downwardly into the operative position it is first necessary for the operator to grasp the members 19ª and move the pivotal connections of the side bars and the legs 21 outwardly beyond the centers stated. When this is done, the oven-sections may be readily lowered.

In order that the two ovens when carried to their upper positions shall not move from such positions, the tables or shelves 24 are placed in position on the ends of the ovens, as shown in Figs. 4 and 6, in such manner that their ends will practically abut, and one of the said tables or shelves is provided with a hasp 35, while the other table is provided with a staple 36, adapted to pass through the hasp and receive a padlock or other fastening device, as is also shown in Fig. 4; but the two tables or shelves may be locked together in any desired manner.

Thus it will be observed that the stove when not in use may be folded to occupy but little room, and if the stove is to be placed upon a pack-saddle the end sections may be readily disconnected from the central section by removing the pivot-bolts 14 and 20.

When the stove is to remain in one place for any length of time, a trench or fire-pit is dug, over which the stove is placed. The stove is then unfolded to its operative position, as shown in Fig. 1, and a banking of sod or of earth is placed at the sides of the stove, forming practically a flue or wind-brake. The fuel is placed beneath any single section or under all of the sections when necessary. When an oven-section is not needed, it may be swung upward to its vertical position over the boilers, retaining the heat within the central section and protecting it in inclement weather. In order to facilitate cooking and to brown articles placed in the ovens, coals of fire may be transferred to the top of the oven-covers, it being possible to retain a bed of such coals on said covers by reason of the flanges 30$^a$, formed at the margins of said covers.

I desire it to be understood that I reserve the right to construct the stove without a framework, the body of the stove being mounted at such time on detachable or pivoted legs connected by any suitable means. I furthermore reserve the right to construct the device so that the sheet-metal sections are removable from the framework.

Having thus described my invention, I claim as new and desire to secure by Letters Patent—

1. A camp-stove, comprising a central casing-section, and box-like oven-sections hinged to opposite sides of the casing-section to swing into vertical or horizontal positions, said oven-sections when swung into vertical positions having their ends overlying the top of the casing-section and their sides overlapping the sides of the casing-section, substantially as described.

2. In a camp-stove, the combination with a central body-section, of box-like oven-sections having a detachable swing connection with the body-section, the end sections being adapted to fold over the top and partly around the sides of the body-section or lie in substantially the same horizontal plane therewith.

3. In a camp-stove, a section adapted to receive boilers, and oven-sections pivoted to the boiler-section, said oven-sections being practically capable of inclosing the boiler-section or of exposing the same, and locking devices for the oven-sections.

4. A camp-stove, comprising a central casing-section, and oven-sections hinged to the casing-sections and having open inner ends, whereby the oven-sections can be swung up to partially inclose the casing-section, as set forth.

5. In a camp-stove, the combination with a central section provided with a casing, of end sections hinged to the central section and provided with ovens having open inner ends and removable covers, whereby when the covers are removed the end sections can be swung up at right angles to partially inclose the said central section, substantially as and for the purpose set forth.

6. In a camp-stove, the combination with a central section provided with a casing for supporting boilers, of end sections hinged to the central sections and provided with ovens having open inner ends and removable covers, and shelves removably secured to the ovens, substantially as described.

7. In a camp-stove, the combination with a central section provided with a casing, of oven-sections hinged to the casing-section and having open inner ends, shelves detachably secured to the outer ends of the ovens, and means for locking the shelves together after they have been carried by the ovens over the top of the casing-section, substantially as described.

8. In a camp-stove, a casing-section, and an oven hinged to the casing-section and having an open inner end, said oven being provided with a perforated removable false bottom, and with a cover having an upwardly-extending flange, as and for the purpose set forth.

9. In a camp-stove, the combination, with a folding frame comprising a central section and end sections, a receptacle carried by the central section and adapted to receive cooking utensils, ovens carried by the end sections, provided with adjustable detachable shelves and with an elevated perforated inner bottom, and means for locking the oven-sections around the central section through the medium of the said shelves, as described.

10. In a camp-stove, a frame comprising a central section and end sections arranged to fold perpendicularly at the end portions of the central section, a utensil-receiving casing supported by the central section of the frame, and ovens carried by the end sections of said frame said ovens having open inner ends and adapted when their sections are folded perpendicularly to partially inclose the utensil-receiving casing.

In testimony whereof I have signed my name to this specification in the presence of two subscribing witnesses.

WILLIAM C. LANDY.

Witnesses:
J. FRED. ACKER,
EVERARD BOLTON MARSHALL.